(12) United States Patent
Villaume

(10) Patent No.: US 8,275,501 B2
(45) Date of Patent: Sep. 25, 2012

(54) METHOD AND DEVICE FOR AIDING THE PILOTING OF AN AIRCRAFT DURING A LANDING

(75) Inventor: Fabrice Villaume, Seysses (FR)

(73) Assignee: Airbus Operations SAS, Toulouse (FR)

( * ) Notice: Subject to any disclaimer, the term of this patent is extended or adjusted under 35 U.S.C. 154(b) by 495 days.

(21) Appl. No.: 12/560,260

(22) Filed: Sep. 15, 2009

(65) Prior Publication Data

US 2010/0070115 A1 Mar. 18, 2010

(30) Foreign Application Priority Data

Sep. 16, 2008 (FR) ..................................... 08 05065

(51) Int. Cl.
*G06F 19/00* (2011.01)
(52) U.S. Cl. .......................................................... 701/18
(58) Field of Classification Search .................... 701/15, 701/16, 14, 18; 703/2; 702/158
See application file for complete search history.

(56) References Cited

U.S. PATENT DOCUMENTS

| 6,304,800 | B1 | 10/2001 | Ishihara |
| 6,477,449 | B1 * | 11/2002 | Conner et al. ..................... 701/4 |
| 7,853,370 | B2 * | 12/2010 | Coulmeau et al. ............... 701/16 |
| 7,916,042 | B2 * | 3/2011 | Constans ....................... 340/945 |
| 8,165,735 | B2 * | 4/2012 | Constans ........................ 701/15 |
| 2004/0026992 | A1 | 2/2004 | Villaume |
| 2005/0006524 | A1 | 1/2005 | Villaume |
| 2008/0012729 | A1 * | 1/2008 | Constans ....................... 340/973 |
| 2008/0162092 | A1 * | 7/2008 | Coulmeau et al. ................ 703/2 |
| 2008/0300741 | A1 * | 12/2008 | Constans ........................ 701/16 |
| 2009/0048724 | A1 | 2/2009 | Caule |
| 2009/0125168 | A1 * | 5/2009 | Voisin ............................. 701/15 |
| 2009/0150012 | A1 * | 6/2009 | Agam et al. ...................... 701/3 |
| 2011/0166723 | A1 * | 7/2011 | Valentova et al. .............. 701/16 |

FOREIGN PATENT DOCUMENTS

| FR | 2 817 979 | 6/2002 |
| FR | 2 857 468 | 9/2005 |
| FR | 2 897 593 | 8/2007 |

OTHER PUBLICATIONS

Preliminary Search Report dated May 5, 2009 w/ English translation.

* cited by examiner

*Primary Examiner* — Mary Cheung
*Assistant Examiner* — Truc M Do
(74) *Attorney, Agent, or Firm* — Dickinson Wright PLLC

(57) ABSTRACT

Disclosed is a method and device for aiding the piloting on an aircraft during a landing phase. One of the landing runways of an airport onto which the aircraft is to land is determined by a runway determination device. A position determining unit is used to determine a current position of the aircraft in a reference frame. A minimum breaking distance is estimated by an estimation unit, upon the aircraft passing above tje determined landing runway. The minimum braking distance is compared by a distance comparison unit with a length of the determined landing runway, and an alert is emitted by an alert unit, when said minimum braking distance is greater than the length of said determined landing runway.

19 Claims, 3 Drawing Sheets

1

METHOD AND DEVICE FOR AIDING THE PILOTING OF AN AIRCRAFT DURING A LANDING

FIELD OF THE INVENTION

The present invention relates to a method and a device for aiding the piloting of an aircraft, in particular of a civilian transport plane, during a landing phase.

BACKGROUND OF THE INVENTION

It is known that, during rollout on a landing runway following a landing (or following a decision to interrupt a take-off), the deceleration (or the braking) of an aircraft is carried out either manually and directly by the pilot using the brake pedals, or by way of an automatic braking system which servo-controls a fixed deceleration predetermined by the pilot before landing, via a push-button or an electro-magnetized rotary button.

However, these braking systems, be they manual or automatic, have no awareness of the topographic reality of the landing runway (length, width, etc.) on which the landing is carried out.

Documents FR-2 817 979 and FR-2 857 468 disclose devices for automatically controlling the deceleration of an aircraft in the rollout phase which make it possible to partly remedy this drawback. These known devices in fact allow the crew of the aircraft to select an exit linkway on the landing runway and to manage automatically and optimally (aid to the selecting of a realistic exit linkway compatible with the known landing performance, minimization of the runway occupancy time, minimization of the necessary braking energy, improvement of comfort) the deceleration of the aircraft during rollout on landing until the selected exit linkway is reached. Consequently, under normal operational conditions, these customary devices guarantee that this exit linkway is reached in an optimal manner.

Moreover, document FR-2 897 593 discloses a method and a system for providing, during a landing, from before the aircraft contacts the landing runway, information about whether the landing will or will not be long, thus leaving time (if appropriate) to effect measures making it possible to remedy the drawbacks of a long landing. Accordingly, the altitude of the aircraft is measured, the horizontal distance separating said aircraft from the proximal end threshold of the landing runway is calculated, and an estimated finishing position of said aircraft on said landing runway is determined on the basis of this altitude and of this horizontal distance, as well as on the basis of an approach angle.

Furthermore, document US-2004/0167685 provides for the calculation of a critical point on the landing runway, beyond which the landing may lead to an overshoot of the runway, and for the emission of an alarm if the current descent axis of the aircraft reaches the runway beyond this critical point.

The object of the present invention is, more particularly, to forewarn the crew of the aircraft against a risk of longitudinal excursion from the landing runway, during rollout on this runway when landing.

It is known that, during a landing, a problem may appear as regards the normality of the landing conditions and their management by the crew of the aircraft. Indeed, before undertaking a flight, the crew must ensure that the landing of the aircraft on the destination airport is possible, that is to say that the scheduled landing performance, allied with expected exogenous conditions (meteorology, knowledge of the destination airport, experience of the crew, etc.) is compatible with the length of the landing runway available at said destination airport.

Nevertheless, it is possible that the meteorological conditions may deteriorate at the moment of the execution of the landing (appearance of strong precipitation, strong wind gradients, etc.) thus making it difficult for the crew to effect the landing right until the aircraft stops on the available length of the landing runway used (or else to obtain a speed which is compatible with the taking of an exit linkway that the aircraft expects to follow). Under such conditions, a risk of longitudinal runway excursion may become significant.

Now, this risk of runway excursion is currently fully managed by the crew, without any assistance, or any automated facility, by virtue of their experience, their training and good preliminary preparation for the flight, this not being satisfactory.

SUMMARY OF THE INVENTION

The object of the present invention is to remedy these drawbacks. It relates to a method for aiding the piloting of an aircraft during a landing phase, which makes it possible to alert the crew of the aircraft against a risk of longitudinal excursion from a landing runway while rolling on this runway.

For this purpose, according to the invention, said method is noteworthy in that:
a) during the landing phase, a landing runway of the airport which is furnished with a plurality of landing runways is determined;
b) characteristics of the landing runway determined in step a) are determined;
c) the current position of the aircraft in a reference frame related to said determined landing runway is determined in a repetitive manner; and
d) as soon as the aircraft passes at a given height [for example at 500 feet (about 150 meters)] above the level of said determined landing runway:
   d1) a minimum braking distance, which represents the distance along the landing runway until the aircraft stops on this landing runway, is estimated with the aid of said current position, of a standard descent plane towards said determined landing runway and of a performance model of the aircraft which is calibrated on the maximum operational braking capabilities of the aircraft;
   d2) this minimum braking distance is compared with the length of said determined landing runway; and
   d3) if said minimum braking distance is greater than the length of said determined landing runway (that is to say if the aircraft stops, longitudinally, downstream of the downstream end of the landing runway), and as long as this is the case, an alert is automatically emitted in the flight deck of the aircraft, to inform the crew that the braking capability of the aircraft will not be sufficient to stop the aircraft safely on said landing runway. Preferably, a visual alert and an audible alert are emitted automatically and simultaneously in said flight deck.

Thus, by virtue of the invention, in case of a risk of longitudinal excursion from the landing runway determined and actually used, that is to say when the minimum braking distance of the aircraft (which depends on the maximum operational braking capabilities and therefore corresponds to the maximum possible braking) is greater than the length of this runway, the crew of the aircraft are forewarned, this being done preferably at one and the same time by a visual alert and by an audible alert. Moreover, these alerts are emitted as long as the risk of runway excursion persists.

According to the invention, the braking of the aircraft can be carried out equally well in a manual manner and in an automatic manner so that the present invention can be applied to all types of existing braking systems.

Moreover, in an advantageous manner, said performance model depends on a forecast state (dry, wet, contaminated) of the landing runway, such as is selected for example by the pilot of the aircraft.

Furthermore, advantageously, in step d1), to estimate the minimum braking distance LD, the following operations are carried out:

a distance APD which relates to an aerial phase above the landing runway is calculated with the aid of the current position of the aircraft with respect to the standard descent plane;

a distance GPO of ground rolling between ground touchdown by the aircraft and the definitive stopping of said aircraft is calculated with the aid of said performance model; and the sum of said distances APD and GPD is computed to deduce therefrom said minimum braking distance LD.

Preferably, said distance GPD is calculated with the aid of a neural net.

Furthermore, to refine the calculations, in an advantageous manner, in step d1), said minimum braking distance is increased if the aircraft is situated above the standard descent plane and will rejoin the latter beyond the threshold of the landing runway.

Moreover, advantageously, a symbology (of variable shape and/or color) illustrating said minimum braking distance is presented on an airport map viewed on a viewing screen of the flight deck. Moreover, this symbology varies as a function of the difference between said minimum braking distance and said length of the determined landing runway, that is to say as a function of the risk of longitudinal excursion from the landing runway.

Moreover, in a particular embodiment, between the aforementioned steps c) and d), an intermediate step is carried out consisting in verifying that the aircraft is indeed about to land on the landing runway determined in step a). This intermediate step is implemented when the aircraft is situated at a predetermined radio-altimetric height, for example 500 feet (about 150 meters). This intermediate step can, in particular, consist in verifying:

that the angular deviation between the magnetic orientation of the determined landing runway and the current magnetic course of the aircraft is much less than a predetermined threshold value, for example 5°; or that the metric deviation between the lateral position of the aircraft and the axis of the determined landing runway is much less than a predetermined threshold value, for example 300 meters.

Within the framework of the present invention, in step a), the landing runway intended for the landing of the aircraft on the airport (which is furnished with a plurality of landing runways) can be selected manually by a crew member, in particular with the aid of an interactive interface means. However, in a preferred embodiment, said landing runway is determined automatically. Accordingly, advantageously, the following series of operations is carried out in an automatic manner:

a1) for each of said landing runways of the airport, the coordinates of the is threshold of the corresponding landing runway are determined, together with its orientation;

a2) a check is carried out, in a repetitive manner, to verify whether a characteristic height which depends on the current altitude of the aircraft and on the altitude of the airport is situated inside a (predetermined) height-wise detection window;

a3) as soon as said characteristic height is situated inside said detection window, for each of said landing runways, an angular deviation between the geographical orientation of the corresponding landing runway and a straight line passing at one and the same time through the current position of the aircraft and the threshold of this landing runway, is calculated, in a repetitive manner, by taking account of the information determined in step a1), these angular deviations being calculated for each landing runway in a repetitive manner, doing so until said characteristic height is again situated outside said detection window; and a4) at this moment, one of said landing runways is determined by taking account of the various angular deviations calculated in step a3).

In this case, advantageously, in step a1), the orientation of a landing runway is determined on the basis of latitudinal and longitudinal coordinates of the threshold (or upstream end) of this landing runway and of latitudinal and longitudinal coordinates of the extremity (or downstream end) of this landing runway.

Furthermore, in an advantageous manner, in step a2):

the median value between the following values is determined as characteristic height: Hp−Ha, Hra and HO, with:

Hp the current baro-inertial altitude of the aircraft;

Ha the altitude of the airport;

Hra the current radio-altimetric altitude of the aircraft; and

HO a predetermined value of height; and a check is carried out to verify that this characteristic height is situated in said detection window which is limited by two predetermined values of height, minimum and maximum.

Moreover, advantageously, in step a3), said angular deviation is calculated for an arbitrary landing runway of index k, by taking account of an orientation $\theta AMk$ which is calculated on the basis of the following expressions:

if $\sin(\mu AC - \mu THRk) < 0$, $$\theta AMk = \arccos\left(\frac{\sin(\lambda AC) - \sin(\lambda THRk) \cdot \cos(\rho AMk)}{\sin(\rho AMk) \cdot \cos(\lambda THRk)}\right)$$

else, $$\theta AMk = 2\pi - \arccos\left(\frac{\sin(\lambda AC) - \sin(\lambda THRk) \cdot \cos(\rho AMk)}{\sin(\rho AMk) \cdot \cos(\lambda THRk)}\right)$$

$$\rho AMk = 2 \cdot R \cdot \arcsin\sqrt{\sin^2\left(\frac{\lambda THRk - \lambda AC}{2}\right) + \cos(\lambda THRk) \cdot \cos(\lambda AC) \cdot \sin^2\left(\frac{\mu THRk - \mu AC}{2}\right)}$$

in which:

$\lambda THRk$ and $\mu THRk$ are the latitudinal and longitudinal coordinates of the threshold of said landing runway of index k;

$\lambda AC$ and $\mu AC$ are the current latitudinal and longitudinal coordinates of the aircraft; and R is the radius of the earth.

Furthermore, in an advantageous manner, in step a4):
the cumulative mean, for each landing runway, of all the corresponding angular deviations calculated in step a3) is calculated;
the various cumulative means thus calculated are intercompared; and
the one whose cumulative mean is the lowest is determined as landing runway.

In a particular embodiment, in step a), the aim of the automatic determination is to confirm a prior manual determination of the landing runway, made by an operator (a crew member of the aircraft).

The present invention also relates to a device for aiding the piloting of an aircraft, in particular of a civilian transport plane, during a landing phase (in the final run before the actual start of braking during the ground roll).

According to the invention, said device is noteworthy in that it comprises:
a runway determination device for determining, during the landing phase, one of said landing runways of the airport, which is intended for the landing;
means for providing characteristics of the determined landing runway;
means for determining the current position of the aircraft in a reference frame related to said determined landing runway;
means for estimating, as soon as the aircraft passes at a given height above said determined landing runway, with the aid of said current position, of a standard descent plane towards said determined landing runway and of a performance model of the aircraft which is calibrated on the maximum operational braking capabilities of the aircraft, a minimum braking distance which represents the distance along the landing runway until the aircraft stops on this landing runway;
means for comparing this minimum braking distance with the length of said determined landing runway; and
activatable means which are apt to emit, automatically and simultaneously, a visual alert and an audible alert in the flight deck of the aircraft to inform the crew that the braking capability of the aircraft will not be sufficient to stop the aircraft safely on said landing runway, the latter means being activated solely when said minimum braking distance is greater than the length of said determined landing runway, and as long as this is the case.

Furthermore, in a preferred embodiment, said runway determination device is intended to automatically determine a landing runway of the airport (which is furnished with a plurality of landing runways), and it comprises, for this purpose, in an advantageous manner:
first means for automatically determining, during a landing phase, for each of the landing runways of the airport, the coordinates of the threshold of the corresponding landing runway together with its orientation;
second means for verifying, in a repetitive manner, whether a characteristic height which depends on the current altitude of the aircraft and on the altitude of the airport is situated inside a predetermined height-wise detection window;
third means for calculating, in a repetitive manner, as soon as said characteristic height is situated inside said detection window, for each of said landing runways, an angular deviation between the geographical orientation of the corresponding landing runway and a straight line passing through the current position of the aircraft and the threshold of this landing runway, by taking account of the information determined by said first means, these angular deviations being calculated for each landing runway in a repetitive manner, doing so until said characteristic height is again situated outside said detection window; and
fourth means for determining one of said landing runways, by taking account of the angular deviations calculated by said third means.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
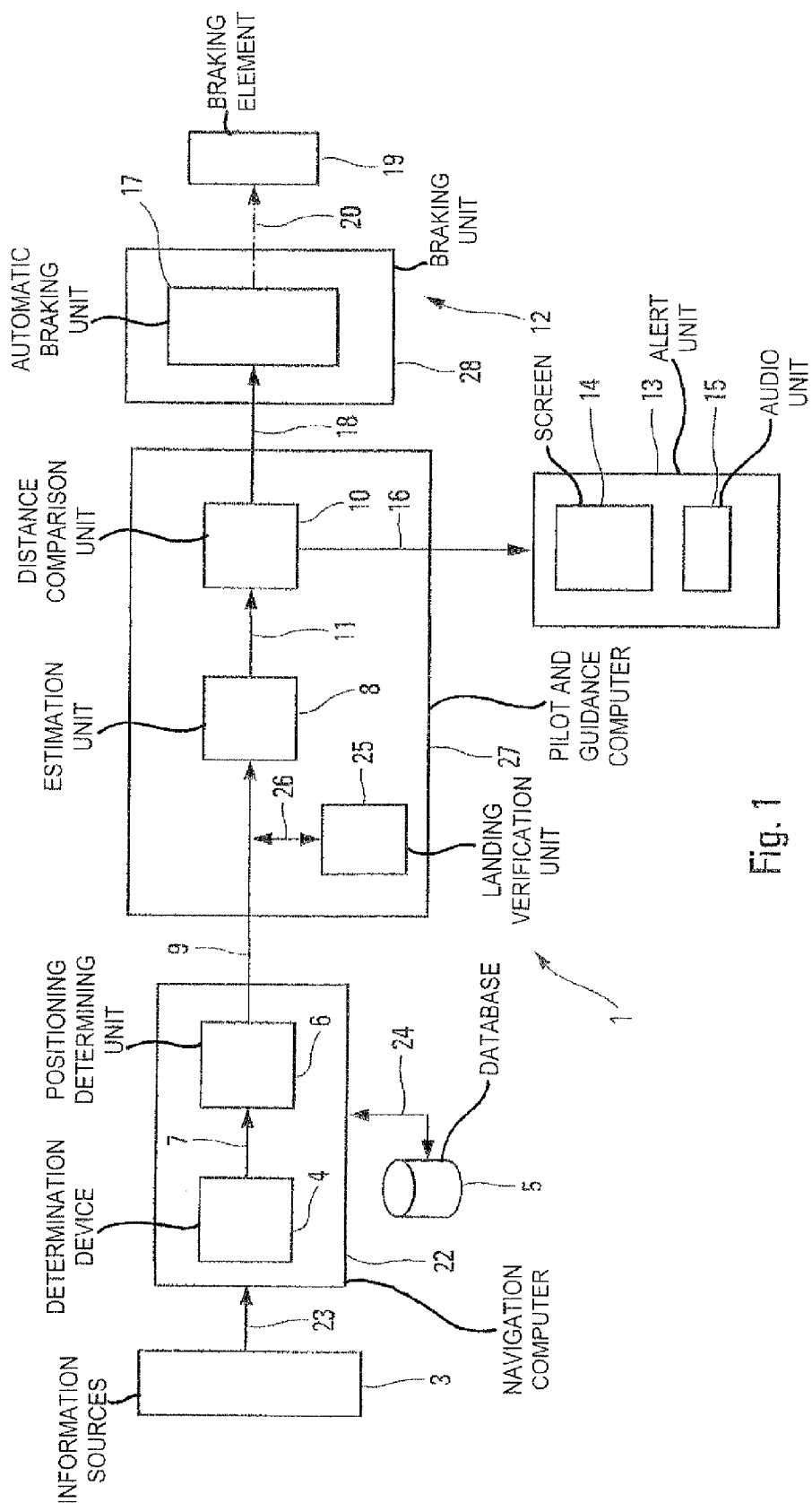
FIG. 1 is the schematic diagram of a device for aiding piloting in accordance with the invention.

The device 1 in accordance with the invention and schematically represented in FIG. 1, is intended to aid the piloting of an aircraft A, in particular of a civilian transport plane, during a landing phase comprising:
a final approach to an airport;
a landing proper on a landing runway 2 of this airport; and
a rolling on this landing runway 2 after this landing.

According to the invention, said device 1 comprises, as represented in FIG. 1:
a set 3 of customary information sources, which are able to determine the current values of various parameters (position, altitude, etc.), specified below, of the aircraft A;
a device 4 making it possible to determine a landing runway of the destination airport during the landing phase, this destination airport being furnished with a plurality of different landing runways;
a database 5 which comprises characteristics of all the landing runways at least of the scheduled destination airport and which makes it possible to provide characteristics (specified below) of the landing runway 2 determined by the device 4;
means 6 which are connected by way of a link 7 to said device 4 and which are apt to determine the current position Pc of the aircraft A, in a reference frame Rp related to the determined landing runway 2 and represented in FIG. 2;
means 8 which are connected by way of a link 9 to said means 6 and which are formed so as to estimate, as soon as the aircraft A passes at a given height above the level of said determined landing runway 2 [for example at 500 feet (about 150 meters)], a minimum braking distance LD which represents the distance along the landing runway 2 until the aircraft A stops on this landing runway 2, as specified below. Said means 8 estimate this minimum braking distance LD with the aid of the current position Pc determined by said means 6, of a standard descent plane towards said determined landing runway 2, and of a performance model of the aircraft A (which is calibrated on the maximum operational braking capabilities of the aircraft A);

means 10 which are connected by way of a link 11 to said means 8 and which are intended to compare the minimum braking distance LD determined by said means 8 with the length LRWY of the landing runway 2, received from the database 5; and activatable means 13 specified below, which are apt to emit automatically and simultaneously (when they are activated) a visual alert and an audible alert in the flight deck of the aircraft A with the aim of informing the crew that the braking capability of the aircraft A will not be sufficient to stop the aircraft safely A on said landing runway 2. Said means 13 are activated only when the means 10 inform them (via a link 16) that the minimum braking distance LD is greater than the length LRWY of the landing runway 2, and as long as this is the case.

These alerts against a risk of runway excursion are, preferably, activated after a predetermined duration (corresponding to a duration of confirmation) after the means 10 have detected that the minimum braking distance LD is greater than the length LRWY of the landing runway 2.

Said means 13 are apt in particular to bring about:

a visual alert on a viewing screen 14 [in particular in the flight deck via a textual message such as "Runway Too Short", in particular on a display means of PFD or ND type] or by way of a telltale light, not represented; and an audible alert by way of customary means 15 (in the form of a continuous or repetitive audio message, in particular of the type "Runway Too Short"). This audible alert can be a voice alert or any other type of sound which is emitted in the aircraft A.

Thus, by virtue of the invention, in case of a risk of longitudinal excursion from the landing runway 2 determined and actually used (that is to say when the minimum braking distance LD of the aircraft A is greater than the length LRWY of this runway 2 and the aircraft A has therefore stopped, longitudinally, beyond the downstream end P2 of the runway 2), the device 1 forewarns the crew of the aircraft A of the existence of this risk, doing so at one and the same time by a visual alert and by an audible alert. Moreover, these alerts are emitted as long as the risk of runway excursion persists.

Said device 1 also comprises a braking system 12 for the aircraft A.

Within the framework of the present invention, the braking of the aircraft A can be carried out in a manual manner. In this case, the device 1 asks the pilot, by way of customary means (for example the viewing screen 14), to bring about (customary manual) braking of the aircraft A.

However, in a preferred embodiment, said braking can also be carried out automatically with the aid of customary automatic braking means 17. These braking means 17 are connected by way of a link 18 to said means 10 which are intended to activate them. In a customary manner, said braking means 17 automatically determine a braking order that they transmit to braking elements 19, in particular to the brakes of the aircraft A, as illustrated by a chain-dotted link 20.

In a preferred embodiment:

said means 4 and 6 form part of a navigation computer 22 which is connected by way of a link 23 to said set 3 of information sources, and by way of a link 24 to said database 5 associated therewith. This navigation computer 22 can be a flight management system of FMS type or an airport navigation system of ANS type ("Airport Navigation System"). If the navigation computer 22 is a flight management system, said database 5 is a customary navigation database, and if said navigation computer 22 is an airport navigation system, said database 5 is a customary airport database;

said alert means 13, which formulate the aforementioned alarms and messages, form part of a flight alarm computer of FWC type ("Flight Warning Computer");

said means 8 and 10, as well as means 25 specified below, form part of a customary piloting and guidance computer 27, such as an automatic pilot; and said braking means 17 form part of a customary braking computer 28.

Furthermore, in a particular embodiment, not represented, said means 8, 10, 17 and 25 can form part of one and the same customary braking computer.

It is known that the destination airport may be furnished with several landing runways, and therefore the landing runway which will actually be used is not known a priori. The latter can be determined:

either by the coordinates (latitude and longitude) of the threshold P1 and of the extremity P2 of this runway 2, and from which it is then possible to deduce its length and its magnetic orientation;

or by the coordinates (latitude and longitude) of the threshold P1, the length LRWY and the magnetic orientation of this runway 2.

Whence, two solutions exist for determining the landing runway to be used:

either this runway is designated by the pilot beforehand, and it is assumed that the aircraft A will land on this preselected runway;

or this runway is detected automatically, by analyzing the position of the aircraft A during the landing phase up to proximity to the ground, with respect to the set of possible landing runways, which are cataloged in the database 5 (navigation, airport, etc.), as specified below.

Knowing the landing runway 2 (designated or detected automatically), it becomes possible to position the aircraft A in relation to this landing runway 2 by way of a direct orthonormal reference frame, whose origin is the threshold P1 of this runway 2 and whose longitudinal axis is the axis Ap of this runway 2. It is also possible to position the aircraft A with respect to a nominal or standard descent plane [in general of the order of 3° of slope finishing at 50 feet (about 15 meters) at the threshold P1 of the runway 2].

The device 1 in accordance with the invention also comprises said means 25 which are, for example, connected by way of a link 26 to said link 9 and which are intended to verify whether the aircraft A is indeed about to land on the landing runway 2 determined by said device 4. As said means 25 form part of a computer 27 which is independent of the navigation computer 22, the device 1 is able to verify the likelihood of the landing runway 2 determined by said device 4 (which is integrated into said navigation computer 22) by independent means, thereby making it possible to increase the reliability of determination. Said means 25 thus make it possible to improve the operating safety of the protection against a risk of runway excursion.

Accordingly, said means 25 employ:

the magnetic orientation of the landing runway 2 (QFU), which either arises from the database 5, or is calculated in the manner specified below;

the lateral position of the aircraft A (ordinate) in the orthonormal reference frame Rp related to the landing runway 2, which is determined as specified below;

the current radio-altimetric altitude of the aircraft A, which is measured by customary means forming part of the set 3 of information sources; and the current magnetic course followed by the aircraft A, which is also measured by customary means forming part of the set 3 of information sources.

Said means 25 verify, when the aircraft A reaches a given radio-altimetric height on descent during the landing phase, for example at 500 feet (about 150 meters), whether:

the angular deviation between the magnetic orientation of the determined landing runway 2 and the current magnetic course of the aircraft A is or is not greater than a given threshold in absolute value, for example 5°; or whether the metric deviation of the lateral position with respect to the axis Ap (represented by broken lines in FIG. 3) of the determined landing runway 2 [equal to the lateral position of the aircraft (ordinate) in the orthonormal reference frame Rp related to the determined landing runway 2] is or is not greater than a given threshold in absolute value, for example 300 meters.

Indeed, it is assumed that the aircraft A is aligned with the axis Ap of the runway 2, under a height of 500 feet with respect to the altitude of the actual landing runway 2. By virtue of the verification implemented by said means 25, the device 1 is capable of verifying that the aircraft A actually lands on the determined landing runway 2.

Figure 2:
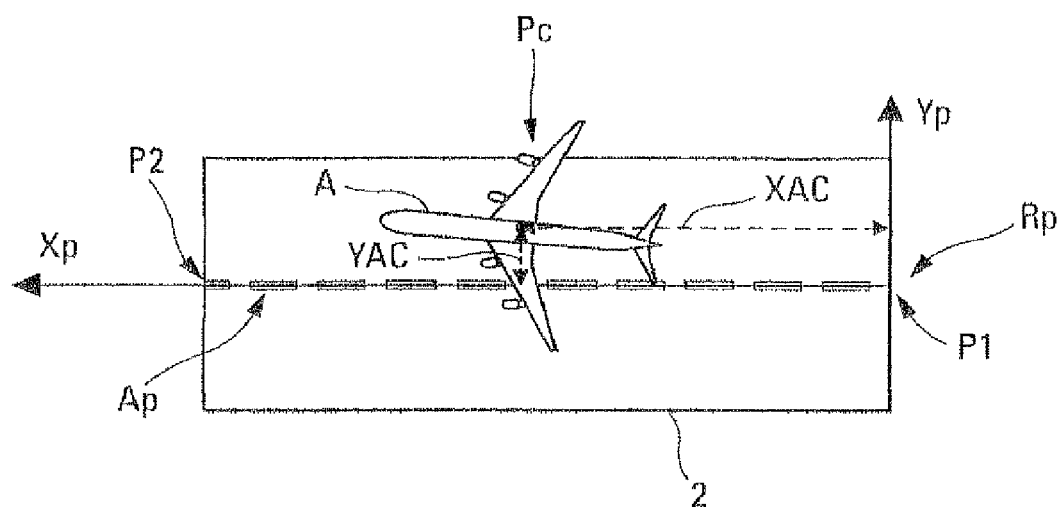
FIG. 2 schematically illustrates a phase of rolling of an aircraft on a landing runway during a landing phase.

The determination of a landing runway 2, implemented by said device 4 and specified below, makes it possible to initiate a query to the database 5. This query makes it possible to recover the characteristics of the landing runway 2 thus determined. Two types of characteristics then exist as a function of the type of database 5. More precisely:

A/ if said database 5 is a navigation database, it contains the latitudinal and longitudinal coordinates of the threshold P1 (upstream end) of the runway 2, as well as the length and the magnetic orientation (QFU) of this runway 2;

B/ if the database 5 is an airport database, it contains the latitudinal and longitudinal coordinates of the threshold P1 of the runway 2, as well as the latitudinal and longitudinal coordinates of the extremity P2 (downstream end) of this runway 2 (FIG. 2).

The orientation of the runway 2 corresponds:

in the above case A, to the magnetic orientation of the landing runway 2 which is entered, in a customary manner, by the crew into the database 5 via a flight management system during flight preparation; and in the above case B, to the geographical orientation of the landing runway 2 which is calculated on the basis of the geographical coordinates of the landing runway 2 arising from the airport database.

In this case B, this orientation QFU is calculated on the basis of the latitudinal and longitudinal coordinates in accordance with standard WGS 84 of the threshold P1 ($\lambda$THR, $\mu$THR) of the runway 2 and of the extremity P2 ($\lambda$END, $\mu$END) of the runway 2. This calculation is such that:

if $\sin(\mu END - \mu THR) < 0$, $$then\ QFU = \arccos\left(\frac{\sin(\lambda END) - \sin(\lambda THR) \cdot \cos(LRWY)}{\sin(LRWY) \cdot \cos(\lambda THR)}\right)$$

if $\sin(\mu END - \mu THR) \geq 0$, $$then\ QFU = 2\pi - \arccos\left(\frac{\sin(\lambda END) - \sin(\lambda THR) \cdot \cos(LRWY)}{\sin(LRWY) \cdot \cos(\lambda THR)}\right)$$

In these expressions, LRWY is the length of the runway 2, meters, calculated as follows:

$$LRWY = 2 \cdot R \cdot \arcsin\sqrt{\sin^2\left(\frac{\lambda THR - \lambda END}{2}\right) + \cos(\lambda THR) \cdot \cos(\lambda END) \cdot \sin^2\left(\frac{\mu THR - \mu END}{2}\right)}$$

with R the radius of the earth, in meters.

The means 6 can then calculate the coordinates of the position of the aircraft A in the orthonormal reference frame Rp associated with the determined landing runway 2. The longitudinal position of the aircraft A on the landing runway 2 corresponds to the abscissa XAC of the position of the aircraft A in this orthonormal reference frame Rp, as represented in FIG. 2.

The lateral position of the aircraft A in the reference frame Rp (which exhibits a longitudinal axis Xp as abscissa and a lateral axis Yp as ordinate and which is defined with respect to the threshold P1 of the runway 2) is calculated on the basis of the following expressions:

$$\begin{cases} XAC = \rho AM \cdot \cos(\theta AM - QFU) \\ YAC = \rho AM \cdot \sin(\theta AM - QFU) \end{cases}$$

in which:

XAC is therefore the longitudinal position of the aircraft A in the reference frame Rp, expressed in meters;

YAC is the lateral position of the aircraft A in the reference frame Rp, expressed in meters;

$\rho AM$ is the distance of the aircraft A with respect to the threshold P1 of the runway 2, expressed in meters;

$\theta AM$ is the geographical heading of the aircraft A, expressed in degrees; and QFU is the geographical heading of the runway 2, expressed in degrees, and obtained as specified above.

The distance $\rho AM$ of the aircraft A with respect to the threshold P1 of the runway 2 is calculated on the basis of the current coordinates $\{\lambda AC, \mu AC\}$ of the aircraft A, preferably of GPS type, and of the geographical coordinates $\{\lambda THR, \mu THR\}$ of the threshold P1 of the runway 2 (arising from the database 5):

$$\rho AM = 2 \cdot R \cdot \arcsin\sqrt{\sin^2\left(\frac{\lambda THR - \lambda AC}{2}\right) + \cos(\lambda THR) \cdot \cos(\lambda AC) \cdot \sin^2\left(\frac{\mu THR - \mu AC}{2}\right)}$$

The geographical heading $\theta AM$ of the aircraft A is calculated on the basis of the GPS coordinates $\{\lambda AC, \mu AC\}$ of the aircraft A:

if $\sin(\mu AC - \mu THR) < 0$, $$\theta AM = \arccos\left(\frac{\sin(\lambda AC) - \sin(\lambda THR) \cdot \cos(\rho AM)}{\sin(\rho AM) \cdot \cos(\lambda THR)}\right)$$

else, $$\theta AM = 2\pi - \arccos\left(\frac{\sin(\lambda AC) - \sin(\lambda THR) \cdot \cos(\rho AM)}{\sin(\rho AM) \cdot \cos(\lambda THR)}\right)$$

Figure 3:
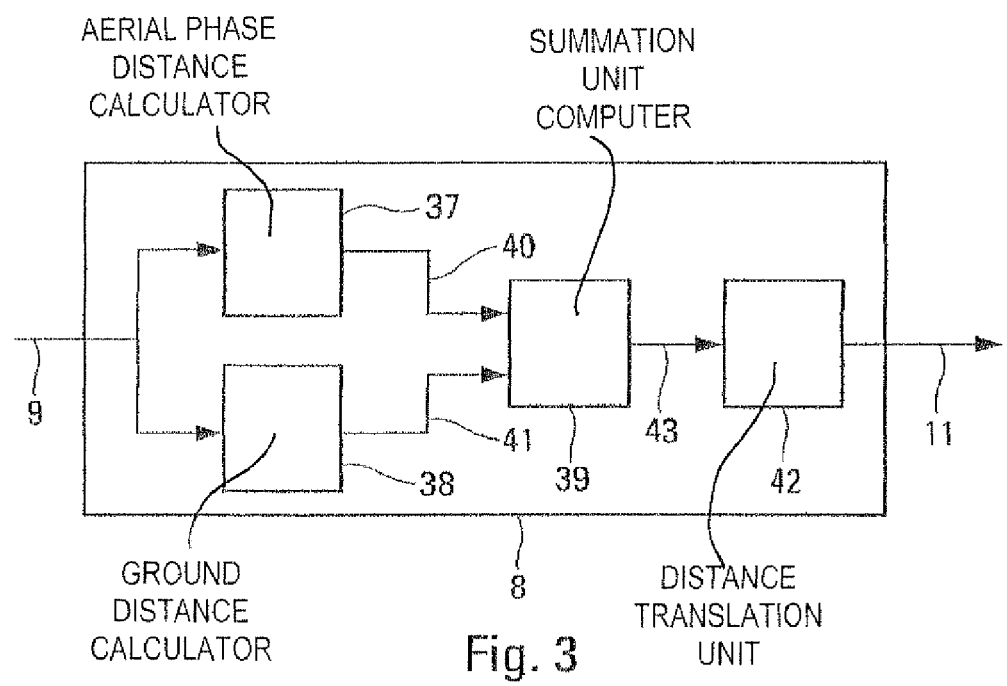
FIG. 3 schematically illustrates calculation means forming part of a device for aiding piloting in accordance with the invention.

Moreover, as soon as the aircraft A passes at a given height, for example at 500 feet (about 150 meters), above the level of the runway 2, said means 8 determine the minimum braking distance LD of the aircraft A. Accordingly, said means 8 comprise, as represented in FIG. 3:

means 37 for calculating, with the aid of the current position Pc of the aircraft A with respect to the standard (or nominal) descent plane, a distance APD which relates to an aerial phase above the landing runway 2;

means 38 for calculating, with the aid of said performance model, a distance GPD of ground rolling between ground touchdown by the aircraft A and the definitive stopping of said aircraft A. Said performance model depends on a forecast state (dry, wet, contaminated) of the landing runway, which is for example selected by the pilot of the aircraft A; and means 39 which are connected by way of links 40 and 41 respectively to said means 37 and 38 and which compute the sum of said distances APD and GPD so as to obtain a minimum distance, from which the longitudinal distance between the current position of the aircraft and the threshold of the runway is subtracted to obtain said minimum braking distance.

In a preferred embodiment, said distance APD corresponds to the distance covered, in the aerial phase, by the aircraft A at the true air speed of TAS type ("True Air Speed"), for a given duration, for example for 5 seconds. Preferably, said means 37 effect at least three different calculations, as a function of the height H of the aircraft A with respect to the landing runway 2, namely:

a) for a height H of greater than 500 feet (about 150 meters);
b) for a height H of between 500 feet and 50 feet (about 15 meters); and
c) for a height H of less than 50 feet.

In situation a), said means 37 calculate said distance APD1 with the aid of the following expression:

$$APD1 = (Vapp + WS) \cdot TAPD$$

in which:
APD1 is therefore the distance (in meters) of the aerial phase for this situation a);
TAPD is a characteristic time (in seconds) of this aerial phase;
Vapp is the predicted approach speed of TAS type, which is expressed in m/s; and
WS is the predicted longitudinal speed of the wind, which is also expressed in m/s.

Moreover, this distance APD1 must satisfy the following condition:

$$APD1 > APDmin$$

where APDmin is a minimum value, expressed in meters.

In situation b), said means 37 calculate said distance APD2 with the aid of the following expression:

$$APD2 = GS1 \cdot TAPD$$

in which GS1 is the current ground speed.

This distance APD2 must also satisfy the following condition:

$$APD2 > APDmin.$$

Furthermore, in situation c), said means 37 calculate said distance APD3 with the aid of the following expression:

$$APD3 = GS2 \cdot TAPD \cdot H/50$$

in which:
GS2 is the ground speed (in m/s) which has been recorded at a height of 50 feet; and
H is the current height of the aircraft A (in feet).

Moreover, the following conditions must be satisfied in this situation c):

$$*GS2 \cdot TAPD > APDmin$$

$$*0 \leq H/50 \leq 1$$

In the above expressions, the characteristic duration TAPD of the aerial phase exhibits a predetermined value, preferably 5 seconds, and the minimum distance APDmin also exhibits a predetermined value, for example 400 meters.

Furthermore, the speed Vapp can be obtained on the basis of a speed Vappfms, via two different procedures. The speed Vappfms is a corrected speed of CAS type ("Calibrated Airspeed") which is displayed on a customary approach performance page relating to a flight management system.

According to a first (preferred) procedure, this speed Vapp is calculated with the aid of the following expression:

$$Vapp = Vappfms \cdot \sqrt{\rho 0/\rho}$$

in which:
Vappfms is therefore the speed displayed on the approach performance page;
$\rho$ is the density of the air at the destination airport; and
$\rho 0 = 1.225$ kg/m$^3$.

Furthermore, according to a second (simplified) procedure, it is possible to calculate the speed Vapp with the aid of the following expression:

$$Vapp = Vappfms \cdot f(Zp)$$

in which:
f(Zp) is a tabulated function of the geometric attitude of the airport, which represents the ratio $\sqrt{\rho 0/\rho}$ (which equals 1 at 0 feet and 1.25 at 15 000 feet); and
Zp is the predicted pressure altitude at the destination airport, expressed in feet.

Furthermore, the aforementioned speed WS is the speed of the longitudinal wind, which is predicted along the axis Ap of the runway 2. This speed WS is deduced from values input into the flight management system on the performance approach page, on the basis of the direction of the wind and of the speed of the wind (input by the crew on this page) and on the basis of the direction of the axis Ap of the landing runway 2, contained in the database 5.

Furthermore:
the speed GS1 is the measured current ground speed (in m/s), which can in particular be calculated in a customary manner by an inertial system, optionally corrected with the aid of values arising from a satellite positioning system;
the speed GS2 is the current ground speed measured at a height of 50 feet above the landing runway 2, this speed being expressed in m/s; and
the height H is the current height of the aircraft A, obtained by a radioaltimeter and expressed in feet.

Moreover, said means 38 calculate the distance GPD by using a performance model of the aircraft A, which is calibrated on the maximum operational braking capabilities, and which depends on the forecast state of the runway 2. This state can in particular be input by the pilot, by way of a customary input means not represented). Within the framework of the present invention, the runway may in particular be dry, wet, or contaminated (that is to say when more than 25% of the surface of the runway is carpeted in snow, ice or stagnant water).

The distance GPD represents the distance covered by the aircraft A between the moment at which its main landing gear touches the landing runway 2 and the moment at which it stops completely on this runway 2.

Figure 4:
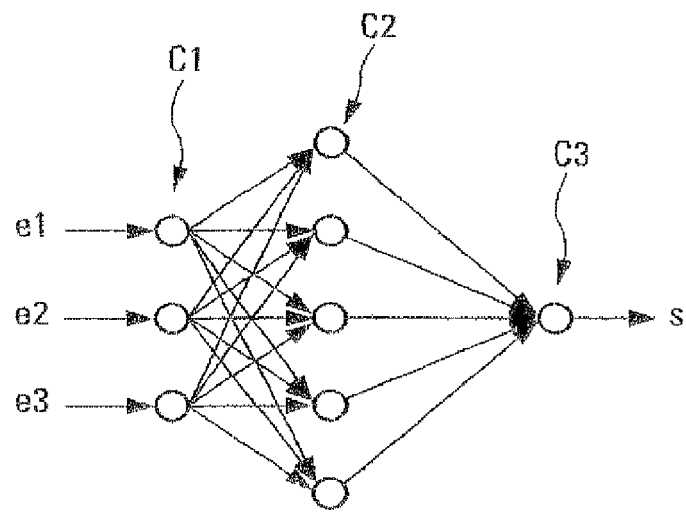
FIG. 4 is a diagram making it possible to explain the operation of a neural net used by the calculation means of FIG. 3.

Said means 38 use a neural net, such as illustrated in FIG. 4. It is known that such a net comprises a layer of inputs C1 comprising a plurality of inputs e1, e2, e3, . . . (of values xi), an intermediate layer C2 (of values si,j), and an output layer C3 which provides the output value s. The model used exhibits the following characteristics:

$$\begin{cases} xi = ei, j \\ si, 1 = \alpha i \cdot ei, 1 + \beta i \\ sj, 2 = \theta\left(\sum_{i=1}^{ne} ai, j \cdot si, +1 + bj\right) \text{ with } \theta(x) = x/(1+|x|) \\ s = \sum_{j=1}^{n} Cj \cdot sj, 2 \\ y = (s - \beta 0)/\alpha 0 \end{cases}$$

with $(\alpha i; \beta i)_{1=0,ne}$ such that $\begin{cases} -1 \leq si, 1 \leq +1 \\ -1 \leq s \leq +1 \end{cases}$ Moreover, the number N of coefficients is equal to:

$$\begin{cases} N = \text{number } (\alpha i; \beta i) + \text{number } (ai, j; bj) + \\ \quad\quad \text{number } (cj) + \text{number}(\alpha 0; \beta 0) \\ N = ne \cdot 2 + n \cdot (ne+1) + n + 2 \\ N = n \cdot (ne+2) + 2 \cdot (ne+1) \end{cases}$$

Said means 38 effect the calculations in general for two different heights H of the aircraft A, namely:
for a height H of greater than 500 feet; and
for a height H of less than 500 feet.

The distance GPD depends on the aerodynamic configuration of the aircraft A, that is to say the position of the slats and flaps during landing.

The calculation relating to the distance GPD (denoted GPD1) is presented first for a runway which is dry.

Firstly, this distance (denoted GPD1a) is calculated for a flight configuration with very enhanced lift, for which the slats and the flaps are completely extended, and which is termed "FULL". This distance GPD1a is calculated with the aid of a non-linear procedure based on a net model using the following expression:

GPD1a=Df1+ΔD1 in which:
Df1 is the distance on the ground in the "FULL" configuration; and
ΔD1 is a predetermined value.

Secondly, this distance (denoted GPD1b) is calculated for an enhanced-lift flight configuration corresponding to the configuration just before the "FULL" configuration, for which the flaps are not completely extended. In this flight configuration termed "CONF 3", the distance GPD1b is deduced from the previous distance GPD1a, with the aid of the following expression:

GPD1b=GPD1a+ΔD2 in which ΔD2 represents the difference in length for the ground phase between the two configurations considered. This value is preferably a predetermined value, for example 50 meters.

In this case, the model used (for the neural net) comprises 6 inputs (ne=6) which relate to the following values (specified below):
the weight GW;
the temperature DISA;
the altitude Zp;
ground speed GS;
the speed of the wind WS; and
the automatic braking mode used.

In this case, the net comprises 20 intermediate neurons in the layer C2 (n=20), and a number of 174 coefficients (N=174), namely 6 αi, 6 βi, 120 ai,j, 20 bj, 20 cj, 1 α0 and 1 β0. The neural net then provides the aforementioned distance Df1 on output.

It will be noted that, for a height H of greater than 500 feet:
the weight GW is the estimated landing weight at the destination airport, this weight being calculated by the flight management system and displayed on the approach performance page;
the temperature DISA is the predicted temperature difference at the destination airport, which is expressed in ° C. or in ° K, between a temperature OAT (which is the predicted temperature of the outside air at the destination airport and which is provided by the flight management system) and a temperature TISA (which is the temperature ISA at the pressure altitude of the airport). TISA is calculated in a customary manner;
the altitude Zp is the predicted pressure altitude at the destination airport, in feet;
the speed GS is the predicted ground speed, in knots;
the speed of the wind WS is the predicted longitudinal speed; and
the automatic braking mode used corresponds to that selected by a rotary button for selecting the automatic deflection mode.

Furthermore, for a height H of less than 500 feet:
the weight GW represents the current weight;
the temperature DISA represents the current temperature difference ISA expressed in ° C. or in ° K, on the basis of the difference between the current temperature of the outside air and the temperature ISA at the current standard pressure altitude;
the altitude Zp is the measured current pressure altitude;
the ground speed GS is the measured current ground speed;
the speed of the wind WS is the current longitudinal speed of the wind, measured in a customary manner; and
the automatic braking mode is the mode which is currently selected.

Said means 38 can calculate, with the aid of a similar neural net, the distance GPD (denoted GPD2) for a wet runway.

In this case, for a "FULL" configuration, said distance (denoted GPD2a) is calculated with the aid of the following expression:

GPD2A=Df2+ΔD3 in which:
Df2 represents the distance on the ground in this "FULL" configuration; and
ΔD3 represents a predetermined value.

Furthermore, in a configuration "CONF3", the distance (denoted GPD2b) of the ground phase can be deduced from the previous distance GPD2a, with the aid of the following expression:

$$GPD2b=GPD2a+\Delta D4$$

in which ΔD4 represents the difference in length for the ground phase between the two configurations considered. This distance can be equal to 50 meters.

In this case, to calculate the distance Df2, the inputs of the neural net are the same as for the previous distance Df1. As regards the output of the neural net, it therefore provides this distance Df2.

Furthermore, in a particular embodiment, said means 8 moreover comprise means 42 which are, for example, connected by way of a link 43 to said means 39 and which make it possible to translate customary bars indicating, for example on the viewing screen 14, the stopping position. These means 42 increase the distances (for a dry runway and a wet runway) as a function of the current trajectory of the aircraft A to a height of less than 500 feet. These distances are increased by a value ΔX under certain particular conditions. In a particular embodiment:
  if the aircraft A is situated below a nominal slope (which exhibits a value of 3° and whose origin is the point situated at 50 feet above the threshold P1 of the landing runway 2), the distances are not increased;
  else:
    if the point estimated at 50 feet ensuring that the aircraft A will follow a descent path of 4° is situated upstream of the landing runway 2, the distances are not increased;
    else, the distances are increased by the following distance ΔX:

$$\Delta X=0.3048.(Z-50)/4+X$$

In the latter expression:
Z is the height (in feet) of the aircraft A above the landing runway 2; and
X is the longitudinal distance (in meters) of the aircraft A with respect to the threshold P1 of the runway.

Moreover, in a particular embodiment, the device 1 can also comprise a man/machine interface (display, etc.), not represented, making it possible to position and to display in real time a symbol illustrating the current position Pc of the aircraft A on an airport map showing the determined landing runway 2, for example of "Electronic Moving Map" type. In this case, the minimum braking distance LD can also be portrayed by an appropriate symbology on the airport map making the crew aware of the risk of excursion (or not) from the runway 2. By way of example, the symbol illustrating the current position Pc of the aircraft A can take the form of a bar which is orthogonal to the axis Ap of the runway 2 and which moves along this axis Ap. This symbol can be red in case of a risk of runway excursion, and green in case of absence of a risk of runway excursion.

Furthermore, said means 10 evaluate the risk of excursion from the runway 2 by comparing the minimum braking distance LD (estimated by said means 8) with the length LRWY of the landing runway 2. Accordingly, said means 10 calculate the deviation Δ between the length LRWY (arising from the database 5) of the landing runway 2 and the minimum braking distance LD, calculated by the means 8:

$$\Delta = LRWY-LD.$$

If this deviation Δ is positive, the means 10 conclude an absence of overshoot of the extremity P2 of the landing runway 2, therefore the absence of a risk of longitudinal runway excursion. On the other hand, if the deviation Δ is negative, said means 10 detect a risk of longitudinal runway excursion.

Figure 5:
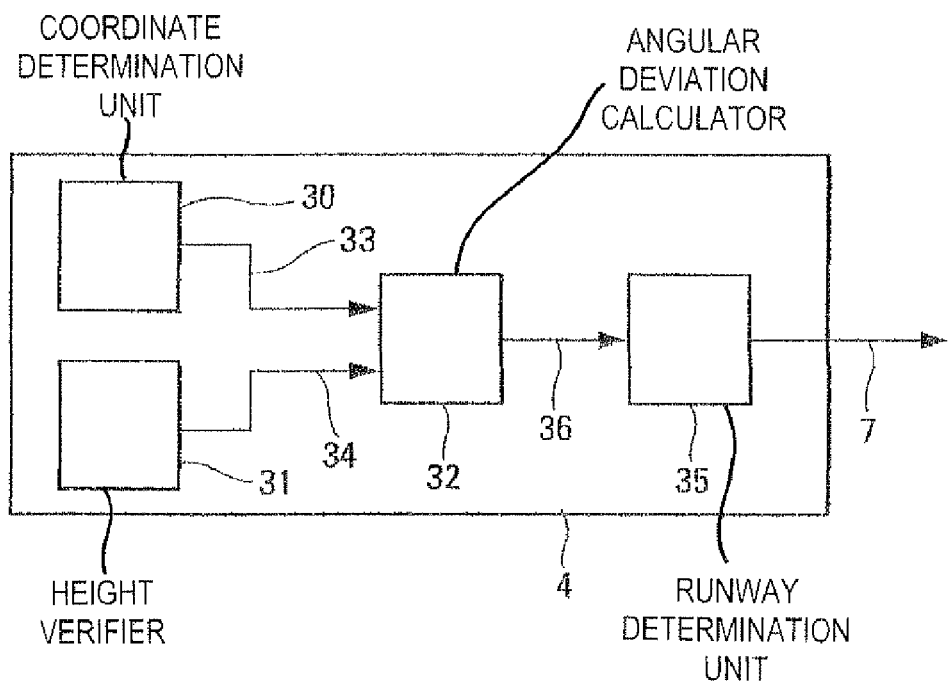
FIG. 5 is the schematic diagram of an automatic device for detecting a landing runway which forms part of a device for aiding piloting in accordance with the invention.

Moreover, said device 4 which makes it possible to determine a landing runway 2 of an airport furnished with a plurality of landing runways, may, within the framework of the present invention:
  either correspond to manual determination means (not represented) such as an interactive interface means (designator, touchscreen, etc., accompanied by a dedicated screen) which is associated with a navigation computer (for example of FMC, ANC or TAWS type) and which allows a crew member to select a landing runway manually;
  or be a device which makes it possible to determine a landing runway automatically, as represented in FIG. 5.
In the latter case, this device 4 may:
  either be used as is, to determine the landing runway 2 automatically;
  or be associated with manual determination means (not represented), with the aid of which a crew member is able to determine a landing runway manually. In this case, the object of the device 4 is to automatically determine a landing runway 2 which is compared with a manually determined landing runway, so as to be able to confirm this manual determination. In the case of disagreement between a manual determination and an automatic determination, means (not represented) of the device 1 provide that the automatic determination implemented by the device 4 prevails.

As represented in FIG. 5, said device 4 comprises, in a preferred embodiment:
  means 30 for automatically determining, during a phase of landing on an airport furnished with a plurality of landing runways, the coordinates of the thresholds of each of these landing runways, as well as their orientation QFU;
  means 31 for verifying, in a repetitive manner, whether a characteristic height HAC which depends on the current altitude of the aircraft A and on the altitude of the airport is situated inside a (predetermined) height-wise detection window;
  means 32 which are connected by way of links 33 and 34 respectively to said means 30 and 31 and which are formed so as to calculate, in a repetitive manner, as soon as said characteristic height HAC is situated inside said detection window, for each of said landing runways, an angular deviation between the geographical orientation of the corresponding landing runway and a straight line passing through the current position of the aircraft A and the threshold of this landing runway. These calculations take into account the information determined by said means 30. These angular deviations are calculated by the means 32 (for each landing runway) in a repetitive manner, doing so until said characteristic height HAC is again situated outside said detection window; and
  means 35 which are connected by way of a link 36 to said means 32 and which are formed so as to determine one of said landing runways, by taking account of the angular deviations calculated by said means 32, as specified below, and to transmit it by way of the link 7.

Said means 30 receive information recorded in the database 5 and they create a sub-database of the set of landing runways of the airport. As indicated previously, these landing runways are cataloged in the database 5:
  in the case of an airport database, by the latitudinal and longitudinal coordinates of the threshold (upstream end) of the runway and of the extremity (downstream end) of the runway; and in the case of a navigation database, by the latitudinal ($\lambda$THR) and longitudinal ($\mu$THR) coordinates of the threshold of the runway and of its magnetic orientation QFU.

The means 30 then create a sub-database of the database 5 (relating to the airport and furnished with a number n of landing runways, n being an integer greater than or equal to 2) which is furnished with n pairs of coordinates ({$\lambda$THR, $\mu$THR}, QFU).

Consequently, in the case of a navigation database, this information is simply extracted from said database 5. On the other hand, in the case of an airport database, said means 30 must calculate the orientation QFUk of each landing runway of index k. This calculation is carried out in the following manner:

$\forall k \in [1,n]$, if $\sin(\mu ENDk - \mu THRk) < 0$, $$QFUk = \arccos\left(\frac{\sin(\lambda ENDk) - \sin(\lambda THRk) \cdot \cos(LRWYk)}{\sin(LRWYk) \cdot \cos(\lambda THRk)}\right)$$

else, $$QFUk = 2\pi - \arccos\left(\frac{\sin(\lambda ENDk) - \sin(\lambda THRk) \cdot \cos(LRWYk)}{\sin(LRWYk) \cdot \cos(\lambda THRk)}\right)$$

where LRWYk is the length of the runway, in meters, which is calculated as follows:

$$LRWYk = 2 \cdot R \cdot \arcsin \sqrt{\sin^2\left(\frac{\lambda THRk - \lambda ENDk}{2}\right) + \cos(\lambda THRk) \cdot \cos(\lambda ENDk) \cdot \sin^2\left(\frac{\mu THRk - \mu ENDk}{2}\right)}$$

with R the radius of the earth (in meters).

Furthermore, said means 31 comprise:
a voter (not represented) which is formed so as to determine, in real time, as characteristic height HAC, the median value between the following values: Hp–Ha, Hra and H0, with:
 Hp the current baro-inertial altitude of the aircraft A (as reference QNH), in feet;
 Ha the altitude of the airport (provided by the database 5), in feet;
 Hra the current radio-altimetric altitude of the aircraft A, in feet; and
 H0 a predetermined value of height, for example 10 000 feet (about 3 km); and
means (not represented) for verifying whether this characteristic height HAC is situated in the detection window which is limited by a predetermined minimum height value Hmin, for example 100 feet (about 30 meters), and by a predetermined maximum height value Hmax, for example 200 feet (about 60 meters).

Preferably, the means 31 make it possible to formulate a Boolean authorizing a test phase implemented by the means 32 and a determination phase implemented by the means 35.

When the aircraft A is in the approach, two situations can arise:
 if HAC is greater than Hmax or less than Hmin, then it is outside the detection window and the (authorization) Boolean is fixed at 0;
 else, said Boolean is fixed at 1.

Said means 32 make it possible to test, when the authorization Boolean is at 1, the set of possible landing runways cataloged in the sub-database created by the means 30. Accordingly, said means 32 calculate the angular deviation $\xi k[i]$ (between the geographical orientation of the runway 2 and the orientation of a straight line passing through the threshold P1 of the runway 2 and the current position Pc of the aircraft A), for each arbitrary landing runway of index k, at each calculation stage of the device 4 (which is assumed to implement p calculation stages during the time that said Boolean is at 1), in the following manner:

$\forall k \in [1,n], \forall i \in [0,p], \zeta k[i] = \theta AMk[i] - QFUk$ $\forall k \in [1,n], \forall i \in [0,p]$, if $\sin(\mu AC[i] - \mu THRk) < 0$, $$\theta AMk[i] = \arccos\left(\frac{\sin(\lambda AC[i]) - \sin(\lambda THRk) \cdot \cos(\rho AMk[i])}{\sin(\rho AMk[i]) \cdot \cos(\lambda THRk)}\right)$$

else, $$\theta AMk[i] = 2\pi - \arccos\left(\frac{\sin(\lambda AC[i]) - \sin(\lambda THRk) \cdot \cos(\rho AMk[i])}{\sin(\rho AMk[i]) \cdot \cos(\lambda THRk)}\right)$$

$$\rho AMk[i] = 2 \cdot R \cdot \arcsin \sqrt{\sin^2\left(\frac{\lambda THRk - \lambda AC[i]}{2}\right) + \cos(\lambda THRk) \cdot \cos(\lambda AC[i]) \cdot \sin^2\left(\frac{\mu THRk - \mu AC[i]}{2}\right)}$$

in which expressions:
 $\lambda$THRk and $\mu$THRk are the latitudinal and longitudinal coordinates (WGS 84) of the threshold of said landing runway of index k;
 $\lambda$AC9[i] and $\mu$AC[i] are the current latitudinal and longitudinal coordinates of the aircraft A; and
 R is the radius of the earth.

The means 32 calculate, moreover, the cumulative mean over the detection window of these deviations. Indeed, assuming that during the time span where the device 4 has seen the detection authorization Boolean at 1, this device 4 has calculated p values of each of these deviations, then the cumulative mean is given by the following formula:

$$\forall k \in [2,n], \bar{\zeta}k = \frac{1}{p+1} \cdot \sum_{i=0}^{p} \zeta k[i]$$

It will be noted that in terms of embedding in the device 4 in which the automatic detection algorithm is situated, it is easy to carry out the calculation of this cumulative mean in a recurrent manner. Indeed:

$j = 0\ Sk[0] = \zeta k[0]$ $j = 1\ Sk[1] = \frac{1}{2} \cdot Sk[0] + \frac{1}{2} \cdot \zeta k[1]$ $\vdots$ $j = i\ Sk[i] = \frac{i}{i+1} \cdot Sk[i-1] + \frac{1}{i+1} \cdot \zeta k[i]$ $\vdots$ $j = p\ \bar{\zeta}k = \frac{1}{p+1} \cdot \sum_{i=0}^{p} \zeta k[i] = Sk[p]$ The means 35 make it possible finally to choose the most likely landing runway throughout the whole of this detection phase. Indeed, as soon as the authorization Boolean drops back to 0, the most likely runway will be the one whose cumulative mean is the lowest, which is formalized in the following manner:

$$\exists k0 \in [2, n], \; \zeta k0 = \min_k \zeta k$$

The landing runway 2 is therefore defined by a pair ({λTHRk0, µTHRk0}, QFUk0).

The invention claimed is:
1. A method for aiding the piloting of an aircraft during a landing phase at an airport having a plurality of landing runways, the method comprising:
   a) determining by a runway determination device one of said landing runways onto which to land the aircraft;
   b) determining characteristics of the landing runway determined in step a);
   c) determining by a position determining unit a current position of the aircraft in a reference frame related to said determined landing runway; and
   d) estimating by an estimation unit, upon the aircraft passing a given height above said determined landing runway, minimum braking distance, wherein the estimation unit:
      calculates by an aerial phase distance calculator a distance APD which relates to an aerial phase above the determined landing runway, wherein the calculator calculates the distance APD with aid of a current position of the aircraft with respect to a standard descent plane and the distance APD corresponds to distance covered in the aerial phase by the aircraft at tru air speed for a given duration,
      calculates by a ground distance calculator a distance GPD of ground distance between ground touchdown by the aircraft and definitive stopping of said aircraft with aid of said performance model, wherein the distance GPD is calculated using a performance model of the aircraft, which is calibrated on maximum operational braking capabilities and the distance GPD depends on aerodynamic position of slats and flaps of the aircraft during landing, and
      computes by a summation computer a sum of said distances APD and GPD and deduces therefrom said minimum braking distance;
   comparing by a distance comparison unit the minimum braking distance with a length of said determined landing runway; and
   emitting an alert by an alert unit, when said minimum braking distance is greater than the length of said determined landing runway, wherein the alert is automatically emitted in a flight deck of the aircraft and inform a crew that aircraft braking capability is not be sufficient to stop the aircraft safely on said landing runway, wherein said minimum braking distance is estimated in accordance with standard descent plane towards said landing runway and of a performance model of the aircraft which is calibrated on maximum operational braking capabilities of the aircraft.
2. The method as claimed in claim 1, wherein in step a), the landing runway intended for the landing of the aircraft on said airport is determined automatically, and wherein, to determine this landing runway, the following series of operations is carried out in an automatic manner:
   a1) for each of said landing runways of the airport, the coordinates of the threshold of the corresponding landing runway are determined, together with its orientation;
   a2) a check is carried out, in a repetitive manner, to verify whether a characteristic height which depends on the current altitude of the aircraft and on the altitude of the airport is situated inside a predetermined height-wise detection window;
   a3) as soon as said characteristic height is situated inside said detection window, for each of said landing runways, an angular deviation between the geographical orientation of the corresponding landing runway and a straight line passing through the current position of the aircraft and the threshold of this landing runway, is calculated, in a repetitive manner, by taking account of the information determined in step a1), these angular deviations being calculated for each landing runway in a repetitive manner, doing so until said characteristic height is again situated outside said detection window; and
   a4) at this moment, one of said landing runways is determined by taking account of the various angular deviations calculated in step a3).
3. The method as claimed in claim 2, wherein in step a), the automatic determination confirms a prior manual determination of the landing runway, made by an operator.
4. The method as claimed in claim 1, wherein a variable symbology illustrating said minimum braking distance is presented on an airport map viewed on a viewing screen, and wherein said symbology depends on the difference between said minimum braking distance and said length of the determined landing runway.
5. The method as claimed in claim 1, wherein between steps c) and d), an intermediate step is carried out comprising verifying that the aircraft is about to land on the landing runway determined in step a).
6. The method as claimed in claim 1, wherein said performance model depends on a forecast state of the determined landing runway.
7. The method as claimed in claim 1, wherein said distance GPD is calculated with the aid of a neural net.
8. The method as claimed in claim 1, wherein said minimum braking distance is increased when the aircraft is situated above the standard descent plane and will rejoin beyond the threshold of the landing runway.
9. A device for aiding the piloting of an aircraft during a landing phase at an airport having a plurality of landing runways, said device comprising:
   a runway determination device configured to determine, during the landing phase, one of said landing runways on which to land the aircraft;
   database configured to characteristics of the determined landing runway;
   position determining unit that determines a current position of the aircraft in a reference frame related to said determined landing runway;
   estimation unit configured to estimate upon the aircraft passing a given height above said determined landing runway, a minimum braking distance which represents aircraft stopping distance on the determined landing runway, wherein the estimation unit comprises:
      an aerial phase distance calculator configured to calculate a distance APD which relates to an aerial phase above the determined landing runway, wherein the calculator calculates the distance APD with aid of a current position of the aircraft with respect to a standard descent plane and the distance APD corresponds to distance covered in the aerial phase by the aircraft at tru air speed for a given duration, a ground distance calculator configured to calculate a distance GPD of ground distance between ground touchdown by the aircraft and definitive stopping of said aircraft with aid of said performance model. wherein the distance GPD is calculated using a performance model of the aircraft. which is calibrated on maximum operational braking capabilities and the distance GPD depends on aerodynamic position of slats and flaps of the aircraft during landing, and summation computer that computes a sum of said distances APD and GPD and deduces therefrom said minimum braking distance;

distance comparison unit configured to comparing the estimated minimum braking distance with a length of said determined landing runway; and alert unit configured to emit automatically and simultaneously a visual alert and an audible alert in a flight deck of the aircraft and inform a crew that aircraft braking capability is not be sufficient to stop the aircraft safely on said landing runway, said alert unit further configured to activate when said minimum braking distance is greater than the length of said determined landing runway, wherein said estimation unit is further configured to estimate said minimum braking distance in accordance with a standard descent plane towards said landing runway and of a performance model of the aircraft which is calibrated on maximum operational braking capabilities of the aircraft.

10. The device as claimed in claim 9, wherein said runway determination device comprises:

coordinate determination unit configured to determine, during a landing phase, for each of said landing runways, threshold coordinates and orientation of the landing runway;

height verifier configured to verify whether a characteristic height which depends on current altitude of the aircraft and altitude of the airport is situated inside a predetermined height-wise detection window;

angular deviation unit configured to calculate, when said characteristic height is situated inside said detection window, for each of said landing runways, an angular deviation between geographical orientation of the landing runway and a straight line passing through the current position of the aircraft (A) and the threshold of the landing runway, by taking account of information determined by said coordinate determination unit, wherein the angular deviations are calculated for each landing runway until said characteristic height is situated outside said detection window; and runway determination unit configured to determine one of said landing runways, by taking account of the angular deviations calculated by said angular deviation unit.

11. An aircraft, which comprises a device such as that specified under claim 9.

12. The device as claimed in claim 9, wherein said aerial phase distance calculator is configured to carry out at least three different calculations, as a function of the height H of the aircraft with respect to the landing runway:

a) for a height H of greater than 500 feet (about 150 meters), b) for a height H of between 500 feet and 50 feet (about 15 meters), and c) for a height H of less than 50 feet, wherein for situation a), said aerial phase calculator calculates said distance APD according to the following expression:

$$APD1=(Vapp+WS)\cdot TAPD$$

in which:
APD1 is distance in meters of the aerial phase;
TAPD is a characteristic time in seconds;
Vapp is a predicted TAS approach speed, which is expressed in m/s; and
WS is a predicted longitudinal wind speed of the wind, which is in m/s, and the distance APD1 satisfies the following condition:

$$APD1>APDmin$$

where APDmin is a minimum value, expressed in meters;

wherein for situation b), said aerial phase calculator calculates said distance APD according to the following expression:

$$APD2=GS1.TAPD$$

in which;
GS1 is current ground speed, and the distance APD2 must satisifies the following condition:

$$APD2>APDmin.$$

wherein for situation c), said aerial phase calculator calculates said distance APD according to the following expression:

$$APD3=GS2.TAPD.H/50$$

in which:
GS2 is ground speed in m/s, recorded at a height of 50 feet; and
H is the current height of the aircraft in feet, $$GS2.TAPD>APDmin, \text{ and}$$

$$0 \leq H/50 \leq 1.$$

13. The device as claimed in claim 12, wherein Vapp is calculated according to the following expression:

$$Vapp=Vappfms\cdot\sqrt{\{squarerootover(\rho 0/\rho)\}}$$

in which:
Vappfms is therefore the speed displayed on the approach performance page;
$\rho$ is the density of the air at the destination airport; and
$\rho 0=1.225$ kg/m3.

14. The device as claimed in claim 12,
wherein Vapp is calculated according to the following expression:

$$Vapp=Vappfms.f(Zp)$$

in which:
f(Zp) is a tabulated function of the geometric attitude of the airport, which represents the ratio $\sqrt{\{squarerootover(\rho 0/\rho)\}}$ (which equals 1 at 0 feet and 1.25 at 15 000 feet); and
Zp is the predicted pressure altitude at the destination airport, expressed in feet.

15. The device as claimed in claim 9, wherein the distance GPD is calculated for a flight configuration with enhanced lift, for which the slats and the flaps are completely extended, and which is termed FULL, and with the distance GPD being calculated according to a non-linear procedure based on a net model according to the following expression:

$$GPD1a=Df1+\Delta D1$$

in which:
  Df1 is the distance on the ground in the FULL configuration; and
  Δ D1 is a predetermined value.

16. The device as claimed in claim 9, wherein the distance GPD is calculated for an enhanced-lift flight configuration corresponding to a configuration just before the FULL configuration, for which the flaps are not completely extended in a flight configuration termed CONF 3, the distance GPD is deduced from the distance GPD1a, according to the following expression:

$$GPD1b = GPD1a + \Delta D2$$

in which Δ D2 represents the difference in length for the ground phase between the two configurations based on a predetermined value.

17. The device as claimed in claim 15, wherein for the FULL configuration, said distance GPD is calculated according to the following expression:

$$GPD2A = Df2 + \Delta D3$$

in which:
  Df2 represents the distance on the ground in the FULL configuration; and
  Δ D3 represents a predetermined value.

18. The device as claimed in claim 16, wherein in the configuration CONF3, the distance GPD of the ground phase is deduced from the distance GPD2a, according to the following expression:

$$GPD2b = GPD2a + \Delta D4$$

in which Δ D4 represents the difference in length for the ground phase between the two configurations.

19. The method as claimed in claim 8, wherein:
  when the aircraft is situated below a nominal slope which exhibits a value of 3° and whose origin is the point situated at 50 feet above the threshold P1 of the landing runway, the distances are not increased; or
  when a point estimated at 50 feet ensuring that the aircraft will follow a descent path of 4° is situated upstream of the landing runway, the distances are not increased;
  otherwise, the distances are increased by the following distance Δ X:

$$\Delta X = 0.3048 \cdot (Z-50)/4 + X$$

wherein
  Z is the height in feet of the aircraft above the landing runway; and
  X is the longitudinal distance in meters of the aircraft with respect to the threshold of the runway.

* * * * *